(12) United States Patent
Boyle

(10) Patent No.: US 6,309,741 B1
(45) Date of Patent: Oct. 30, 2001

(54) SHOPPING CART SHELF/SEAT PAD SHOPPING CART FRONT BASKET PAD AND SHOPPING BASKET PAD

(76) Inventor: William P. Boyle, 24 The Hamlet, Pelham, NY (US) 10803

( * ) Notice: Subject to any disclaimer, the term of this patent is extended or adjusted under 35 U.S.C. 154(b) by 0 days.

(21) Appl. No.: 09/235,200

(22) Filed: Jan. 22, 1999

Related U.S. Application Data

(60) Provisional application No. 60/072,332, filed on Jan. 23, 1998.

(51) Int. Cl.[7] ................. B32B 3/26; A47D 7/04
(52) U.S. Cl. ................. 428/304.4; 428/314.4; 297/485; 297/488; 297/219.1; 297/219.12; 297/256.17; 297/250.1
(58) Field of Search ............. 297/485, 488, 297/219.1, 219.12, 256.17, 250.1; 428/304.4, 314.4

(56) References Cited

U.S. PATENT DOCUMENTS

| | | | |
|---|---|---|---|
| 4,316,297 | * 2/1982 | Geist | 5/420 |
| 4,588,224 | * 5/1986 | Hill, Jr. | 297/4 |
| 4,655,502 | * 4/1987 | Houllis | 297/229 |
| 5,106,155 | * 4/1992 | Luehring | 297/250 |
| 5,238,293 | * 8/1993 | Gibson | 297/229 |
| 5,678,888 | * 10/1997 | Sowell et al. | 297/256.17 |
| 5,855,412 | * 1/1999 | Smith et al. | 297/256.17 |
| 5,967,607 | * 10/1999 | Waldroup | 297/256.17 |

* cited by examiner

*Primary Examiner*—Mark Kopec
*Assistant Examiner*—Charles Boyer
(74) *Attorney, Agent, or Firm*—Stroock & Stroock & Lavan LLP

(57) ABSTRACT

A shopping cart having a foam pad designed to reduce bruising and other damage to fruits and vegetables as well as provide additional comfort to young children sitting on the pad is provided. The pad should be formed of closed-cell FDA approved foam, having a protective water impermeable skin substantially surrounding exposed surfaces of the foam. The skin should also be FDA approved.

10 Claims, 2 Drawing Sheets

SHOPPING CART SHELF/SEAT PAD SHOPPING CART FRONT BASKET PAD AND SHOPPING BASKET PAD

CROSS REFERENCE TO RELATED APPLICATION

This application is a continuation-in-part of application Ser. No. 60/072,332, filed Jan. 23, 1998, the contents of which are incorporated herein by reference.

BACKGROUND OF THE INVENTION

This invention relates generally to shopping carts, and more particularly, to a shopping cart having a shelf pad designed to reduce bruising and other damage to fruits and vegetables, baked goods and other damage sensitive items while in the shopping cart and also to provide additional comfort to young children while sitting on the same shopping cart shelf, which can also function as a seat.

Shopping carts are produced by a variety of manufacturers in a variety of different sizes and configurations. They are generally made of steel or other metal with nickel-chrome plating and possibly an acrylic coating. They are also made of high impact plastic combined with steel or other metal components. Such shopping carts generally feature a collapsible rear shelf designed to seat small children and which can also function to hold fruit, vegetables and other damage sensitive items which could be damaged if placed in the main body of the shopping cart.

The use of a suitable shelf/seat pad would not only reduce damage to fruits, vegetables, baked goods and other delicate and damage sensitive items but also provide additional comfort to young children sitting on the shelf/seat. It is desirable for the padded material to be sanitary and clean looking. However, at the present time, no cushioning or padded material is used to cover the shopping cart shelf/seat area.

Accordingly, it is desirable to improve shopping carts by making them more comfortable for small children to ride in and to provide greater damage protection for sensitive items.

SUMMARY OF THE INVENTION

Generally speaking, in accordance with the invention, a shopping cart shelf/seat pad is provided that exhibits the following characteristics: 1) the pad should have high shock absorption to reduce damage to fruits, vegetables, baked goods, and other delicate and damage sensitive items as well as provide additional comfort to young children sitting on the shelf/cat; 2) the pad should be 100% closed-cell foam construction, so as not to absorb any water, fungus or bacteria; 3) the pad should be fully-covered on all surfaces by a tough skin highly resistant to impact forces caused by dropping items onto the pad and to ensure that any liquid or other substances spilled onto the pad does not enter the padding or somehow remain on the surface and therefore can be cleaned with soaps, steam or other disinfectants to meet the strict sanitary guidelines of supermarkets and grocery stores; 4) the pad should display high weather resistance and also be resistant to ultraviolet light since the shopping carts are frequently taken outdoors to the customers' cars for unloading and left in the shopping cart corrals for variable lengths of time in all weather conditions; 5) the padding should have FDA approval for contact with fruits and vegetables since it is envisioned that the great majority of shoppers would not have young children sitting on the shelf/seat but would use such shelf/seat to hold bruise and damage sensitive fruits, vegetables, baked goods and other damage sensitive items; and 6) the pad can display an indicia, such as a character or advertisement.

DESCRIPTION OF THE DRAWINGS

For a fuller understanding of the invention, references is made to the following description taken connection with the accompanying drawings and which.

DETAILED DESCRIPTION OF THE PREFERRED EMBODIMENTS

Figure 1:
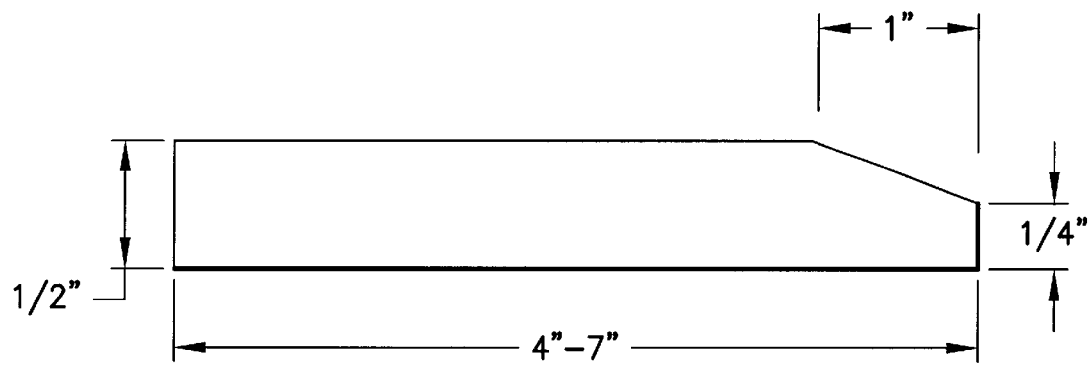
FIG. 1 is a perspective cross-sectional view of the shopping cart shelf/seat pad in accordance with the invention.
Figure 2:
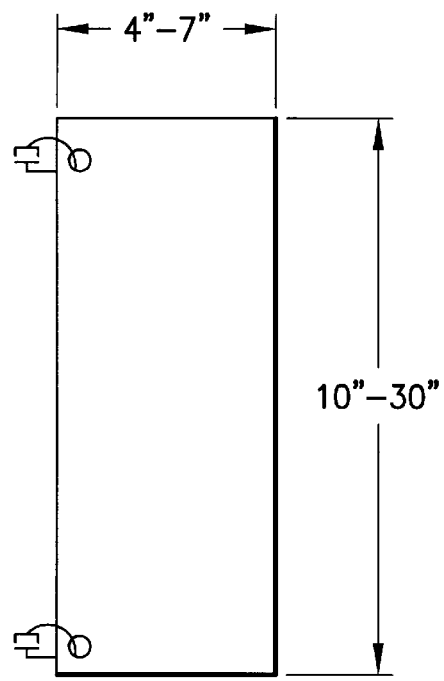
FIG. 2 is a perspective view of the shopping cart shelf/seat pad of FIG. 1.
Figure 3:
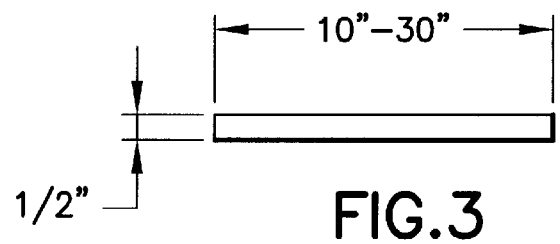
FIG. 3 is a side view of a pad constructed in accordance with another embodiment of the invention.
Figure 4:
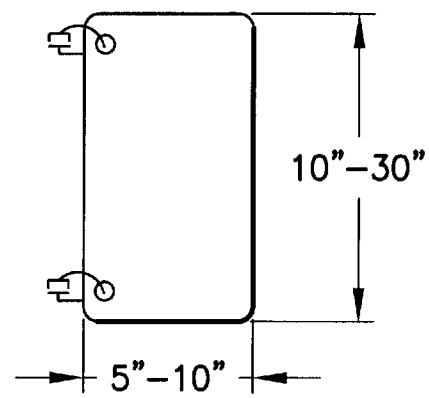
FIG. 4 is a top view of the pad of FIG. 3.
Figure 5:
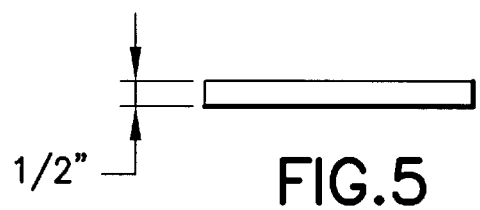
FIG. 5 is a side view of a pad constructed in accordance with another embodiment of the invention.
Figure 6:
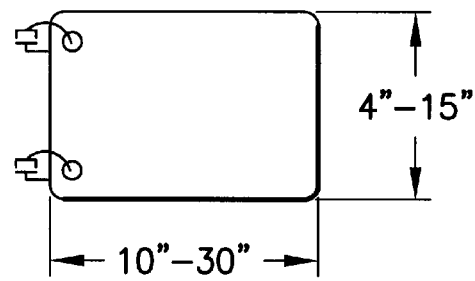
FIG. 6 is a top view of the pad of FIG. 5.

A shopping cart shelf/seat pad constructed in accordance with a preferred embodiment of the invention can be constructed of closed-cell foam, such as 100% PVC closed-cell foam. One particularly well suited foam to be used is now manufactured for Connecticut Valley Corp., 6 Bridge Street, Shelton, Conn. 06484 by Spongex Corp. of Shelton, Conn., under a designation VS-300 and under the trademark NOBRUZE PROTECTIVE PADDING. In a preferred embodiment, the pad is about ½ inch thick with one edge tapered about to ¼ inch to permit the shopping cart shelf/seat to be easily folded or collapsed without interference or damage to the pad. Thicknesses of about ¼ to about 1 inch are acceptable. In a preferred embodiment the padding can have a density of 2–5 preferably 3–4 lbs per cubic foot. A compressive resistance at 25% deflection under ASTM D-1667-91 should be about 1.0 to 3.0, preferably about 1.5 to 2.5 psi.

In a preferred embodiment the width is from about 4 to 7 inches to match the width of the shopping cart shelf/seats manufactured by various companies but in any event the pad would be custom made to match the various widths of shelf/seats manufactured and sold to date.

In a preferred embodiment, the pad has lengths ranging from about 10 to 30, preferably 15 to 30 inches, to match the various lengths of the shopping cart shelf/seats manufactured and sold.

In a preferred embodiment, the pad is thermo-compression molded to create a pad with a tough protective skin that is not a laminate but rather an integral part of the pad itself The full skin surface can prevent the infiltration of water fungus and bacteria and enable the pad to be easily cleaned with soap, steam or disinfectants.

In a preferred embodiment the pad will have no cut edges without a skin surface. Such cut surfaces can be hard to clean, particularly if stained by urine or fecal matter from a child and would pose a definite sanitary risk of contamination to consumers particularly with regard to fruits, vegetables and baked goods placed on such a contaminated pad. Cut surfaces of the foam pad should have water absorption under ASTM D-1667-91 of under 0.1 lb/ft$^3$, preferably 0.06 or less.

In a preferred embodiment, the pad would be manufactured from the same materials used to make NOBRUZE PROTECTIVE PADDING™, which is FDA approved closed-cell 100% PVC flexible foam currently sold to the agricultural market by Connecticut Valley Corp. and manufactured for Connecticut Valley Corp. by Spongex Corp., 6 Bridge Street, Shelton, Conn. Although other closed-cell foams with similar characteristics may be used, particularly if they have FDA approval and are fully covered with a protective skin also FDA approved to meet the sanitary requirements of supermarkets particularly with regard to contact with fruits, vegetables and baked goods, this foam in the following specification:

| PROPERTY | UNITS | METHOD | VALUE |
|---|---|---|---|
| Compressive Resistance 25% Deflection | PSI | ASTM D-1667-91 | 1.5–2.5 ± 0.5 |
| Density | lbs./cu ft. | ASTM D-1667-91 | 3 ± 1 |
| Buoyancy | lbs./cu ft | CG-164.015 | 55 ± 1 |
| Tensile Strength S15 NS | PSI | Mil-P 15280D | 50 30 |
| Ultimate Elongation | % | Mil-P 15280D | 75 |
| Water Absorption | lbs/cu. ft. cut surface | ASTM D-1667-91 | 0.06 |
| Flammability Flame out seconds Char Length | seconds inches | Mil-P25280D | 2.0 1.0 |
| Compression Set (room temperature) 25% | % of original Deflection | ASTM D-1667-91 height | 20 |
| High Temperature Resistance | ° F. | — | 125° F. Continuous/ 212° F. Intermittent |
| Cold Crack 180° bend around ½" Mandrel | ° F. | Mil-P. 12420C | 40 |
| Linear Shrinkage 7 days/ 140° F. | % | Mil-P. 15280D | 0–1.5 |
| Weather Resistance Weatherometer | — — | ASTM D-1449 | Excellent |
| Odor | — | Mil-P.15280D | Not offensive |
| Thermal Conductivity K Factor @ 75° F. | BTU/Hr. in./sq. ft. | ASTM | 0.25 |
| R Factor | ° F. | C-177-63 | R-4 |
| Energy Absorption 30" Rebound 1¼" Steel Ball | Inches % Max | Mil-P-12420C | — |

In a preferred embodiment, the cart shelf/seat pad has soft or hard plastic grommets in the two forward corners through which plastic, ball-chain, or wire tie strings can be inserted.

In a preferred embodiment, the tie strings are tied to the forward-most steel rod of the shelf/seat and the ends of the tie strings would join to each other with a ball and pocket type mechanism to prevent removal of the pad but tie strings with self-locking apparatus of other types may be used along with plastic circle rings with interlocking ends.

In a preferred embodiment the tie apparatus discussed above are tied to the forward-most steel rod of the shelf/seat to permit the rear edge of the pad to be lifted to allow the hard plastic seat/leg hole cover to be raised to cover the leg holes on the rear panel of the cart.

This invention also relates generally to a shopping cart front basket pad to be used to line the entire bottom floor or portions of elevated front baskets which manufacturers offer on certain lines of shopping carts. These front baskets are attached to the front wall of the shopping cart in which they are installed, and are typically used to carry fruit, vegetables, baked good sand other damage sensitive items. The same padding, in ½ inch thickness can line the bottom dimensions to match each front basket.

This invention also relates generally to a shopping basket floor pad to line the bottom of plastic or metal stackable shopping baskets. These baskets typically measure 10–30 inches long, 4–15 inches wide and 5–11 inches deep. The same padding can line the bottom and be manufactured to match the dimensions of shopping baskets produced by manufacturers.

In one preferred embodiment, the pad can display an indicia such as a decorative or promotional character or advertisement, and even be in the shape of such character.

It is also to be understood that the following claims are intended to cover all of the generic and specific features of the invention herein described and all statements of the scope of the invention which, as a matter of language, might be said to fall therebetween.

Particularly it is to be understood that in said claims, ingredients recited in the singular are intended to include compatible mixtures of such ingredients wherever the sense permits.

What is claimed is:

1. A shopping cart, having a main basket section for holding items and a shelf portion, positioned towards the top of the main basket section; and a pad formed of 100% closed-cell foam, having a water impermeable skin substantially covering the entire exposed outer surface thereof, coupled to the shelf, the foam having a density of 2 to 5 pounds per cubic foot wherein the foam has a compression resistance at 25% deflection under ASTM D-1667-91 of about 1 to about 3 psi, the foam pad is FDA approved for coming in contact with fruits or vegetables and the shelf and pad are configured and arranged to serve as a seat for a small child.

2. The shopping cart of claim 1, wherein the foam has a compression resistance at 25% deflection under ASTM D-1667-91 of about 1.5 to about 2.5 psi.

3. The shopping cart of claim 1, wherein the pad is pivotably coupled to the shelf and the shelf is pivotably coupled to the shopping cart.

4. A pad constructed and sized to be used as cushioning material for a shopping cart, comprising closed-cell foam having its exposed surface substantially covered with a protective skin unitary with the foam, the skin substantially impermeable to water; both the foam and the skin having FDA approval for contacting fruits or vegetable, the foam having a compressive resistance at 25% deflection under ASTM D-1667-91 of 1.0 to 3.0 psi and a compression set at room temperature and 25% deflection under ASTM D-1667-91 of 20% of its original height.

5. The pad of claim 4, having a length of 10 to 30 inches and a width of 4 to 7 inches and a thickness of about ¼ to 1 inch are acceptable.

6. The pad of claim 4, wherein the pad includes 2 grommet at corners along one of the edges thereof for coupling the pad to a shopping cart.

7. The pad of claim 4, wherein the foam is 100% PVC closed-cell flexible foam, having a water absorption under ASTM D-1667-91 of less than 0.1 lbs per cubic foot cut surface.

8. The pad of claim 4, wherein the foam has a density of 2 to 5 lbs/ft$^3$.

9. The pad of claim 4, wherein the foam has a density of 3 to 4 lbs/ft$^3$.

10. The pad of claim 1, wherein the foam has a density of 3 to 4 lbs/ft$^3$.

* * * * *